United States Patent [19]

DeMets

[11] 4,132,520

[45] Jan. 2, 1979

[54] APPARATUS FOR THE PRODUCTION OF A MIDDLE LAYER OF CHIPBOARDS OR THE LIKE AND/OR FOR THE MANUFACTURE OF CHIPBOARDS CONSISTING ESSENTIALLY ONLY OF ONE MIDDLE LAYER

[75] Inventor: Albert DeMets, Kachtem, Germany

[73] Assignee: Bison-werke Bähre and Greten GmbH & Co. KG, Germany

[21] Appl. No.: 781,924

[22] Filed: Mar. 28, 1977

Related U.S. Application Data

[63] Continuation of Ser. No. 575,041, May 6, 1975, abandoned.

[30] Foreign Application Priority Data

May 9, 1974 [DE] Fed. Rep. of Germany ....... 2422468

[51] Int. Cl.$^2$ .......................... B29B 1/04; B29J 5/00

[52] U.S. Cl. .................................. 425/199; 425/81.1; 264/112; 209/255

[58] Field of Search .................................. 425/80-83, 425/224, 199; 209/311-313, 240, 255; 264/112, 113

[56] References Cited

U.S. PATENT DOCUMENTS

| | | | |
|---|---|---|---|
| 2,737,997 | 3/1956 | Himmelheber et al. | 425/81 X |
| 2,746,895 | 5/1956 | Duvall | 425/81 X |
| 3,028,287 | 4/1962 | Greten | 425/81 X |
| 3,171,872 | 3/1965 | Jarrett et al. | 425/81 X |
| 3,214,316 | 10/1965 | Waenerlund | 425/81 |
| 3,284,266 | 11/1966 | Clifford | 4 25/81 |
| 3,312,999 | 4/1967 | Greten et al. | 425/81 |

*Primary Examiner*—Robert L. Spicer, Jr.
*Attorney, Agent, or Firm*—Craig & Antonelli

[57] ABSTRACT

Apparatus for the production of a middle layer of chipboards or the like and/or for the manufacture of chipboards formed only from middle layer material includes at least one spreading station associated with a spreading chamber arranged above a moving support for the reception of a chip layer or the like, the entire fine or coarse materials serving for the formation of a type of middle layer being fed by at least one metering tank to the support. The apparatus is further characterized in that at least one inclined screen which can be reciprocated in an essentially horizontal direction is disposed underneath the delivery point of the metering tank and a spreading roll is disposed underneath the lower edge of the screen in parallel to the screen edge, the roll serving for feeding the coarser material to the space lying beneath the screen.

23 Claims, 3 Drawing Figures

APPARATUS FOR THE PRODUCTION OF A MIDDLE LAYER OF CHIPBOARDS OR THE LIKE AND/OR FOR THE MANUFACTURE OF CHIPBOARDS CONSISTING ESSENTIALLY ONLY OF ONE MIDDLE LAYER

This is a continuation, of application Ser. No. 575,041 filed May 6, 1975, now abandoned.

BACKGROUND OF THE INVENTION

This invention relates to an apparatus for the production of a middle layer of chipboards (i.e. particle boards) or the like and/or for the manufacture of chipboards consisting essentially only of one middle layer, with at least one spreading station associated with a spreading or stewing chamber arranged above a moving support, such as an endless chip layer carrier or the like, for the reception of a chip layer (i.e. particle layer) or the like, to which the entire fine and coarse material serving for the formation of a type of middle layer can be fed via at least one metering tank.

Actually, two methods are utilized for the production of chipboards or the like, namely the so-called throw spreading process and primarily the air screening process. Both methods are based on the idea of applying the material to be used for the formation of a chip layer or the like to a layer carrier in the sifted condition, in order to obtain in the zone of the topside and underside of the boards to be manufactured a maximally fine to dust-like material, whereas the topside layer is followed in the downward direction by fine, rather coarse, coarse, rather coarse, and fine particles. Thus, normally coarse material is present in the middle layer (DAS [German Published Application] 1,228,404). If the so-called middle layer is relatively thick, the material for this middle layer is optionally also fed to the layer carrier in the unsifted state. Also, measures have been taken, namely by the arrangement of additional spreading or strewing stations, to include also finer components in the rather coarse and/or coarse material to fill up any present cavities with these fine particles (DAS 1,109,867). This increases the transverse tensile strength.

The glue-covered components available for the formation of a chipboard normally consist of various fractions.

First fraction:

[a] Larger, thinner particles having a width of 2–25 mm., a length of 10–25 mm., and a thickness of 0.2–0.5 mm.

[b] Larger, thicker particles having the same external dimensions as indicated under (a), but with a thickness of 0.5–2 mm.

and thereabove.

Second fraction:

[a] Smaller, thicker particles (granular).

[b] Smaller, thinner particles (dust and fibers).

In general, it is desirable to manufacture chipboards having a maximally fine, closed surface. To attain this objective, dust and fibrous particles (second fraction [b]) are to be brought to the surface. This can be readily effected most advantageously by means of conventional air screening stations which bring dust, as well as fine and fibrous particles, to the surface of the layer to be compressed into a board. Moreover, the chipboards or the like are to exhibit good mechanical properties, i.e. they must not only have a sufficient transverse tensile strength, but also an adequate bending strength [flexural strength]. Therefore, a kind of middle layer is provided between the two outer layers, namely a mixture of rather large, thicker particles (first fraction [b]) and smaller, thicker particles (second fraction [a]) wherein the smaller, thicker particles fill out the spaces between the larger, thicker particles, which enhances the transverse tensile strength.

The flexural tensile strength can be increased by providing larger, thinner particles (first fraction [a]) respectively underneath or above the fine surface layers, for example at least underneath the upper, fine-particle surface layer.

SUMMARY OF THE INVENTION

Therefore, this invention i based on the problem of making available an apparatus with at least one spreading station associated with a spreading chamber, arranged above a moving support, such as an endless chip layer carrier or the like, for receiving a layer of chips or the like, to which the entire fine or coarse material serving at least for forming a kind of middle layer can be fed via at least one metering tank, with the effect that these larger, thinner particles (first fraction [a]) are associated with a fine surface, without spreading the fine material (parts of the second fraction [a] and/or [b]) by means of spreading or sterswing rolls. This problem is solved in accordance with this invention by providing underneath the delivery point of the metering tank at least one inclined screen, which can be reciprocated in an essentially horizontal direction, and under the lower screening edge of this screen a spreading roll in parallel to the screen edge which serves for feeding the coarser material to the area present underneath the screen. In this case, where only one metering tank is required, the middle layer is not formed symmetrically to the two cover layers. If a symmetrical arrangement is to be obtained, a roof-shaped baffle should be disposed underneath the delivery point of the metering tank and therebeneath two screens arranged in a roof-life configuration and reciprocating in an essentially horizontal direction, respectively one spreading roll being located underneath the lower edges of these screens. Of course, it is also possible to provide two metering tanks feeding the material to be spread to respectively one of the screens. If only one metering tank is present, it is advantageous to arrange, between the delivery point of this metering tank and the roof-shaped baffle, deflection plates pivotable about horizontal axes which distribute the entire material fed thereto uniformly to the two screens disposed therebeneath.

Furthermore, it is advantageous to arrange underneath the screen a device which ejects screening sifting air in the horizontal direction, essentially in opposition to the direction into which the medium-coarse and coarser particles are thrown by the spreading rolls. Corresponding remarks apply with regard to the oscillating screens; in this case, a device ejecting screening air in opposite directions is mounted underneath the oscillating screens. The device ejecting screening air should be disposed above the horizontal plane defined by the axis (axes) of rotation of the spreading roll (rolls).

It is advantageous to mount the oscillating screens along their horizontally extending edges to rocking levers arranged outside of the forming station. The rocking levers in closest adjacency to each other are joined together and can be pivoted in a controlled fashion. The pivotable bearing points of the levers in closest adjacency to each other should be connected by means of plates, and one of these plates should be able to reciprocate by means of an eccentric drive.

In order to be able to clean the shaping station, e.g., if this should prove necessary, it is advantageously to arrange this station so that it is displaceable at right angles to the traveling direction of the conveyor means carrying the chip layer; thus, after safety means have been released, the shaping station can be laterally moved out of the apparatus.

BRIEF DESCRIPTION OF THE DRAWINGS

The invention will be explained hereinbelow with reference to an embodiment schematically illustrated in the drawings, to wit.

DETAILED DESCRIPTION

Figure 1:
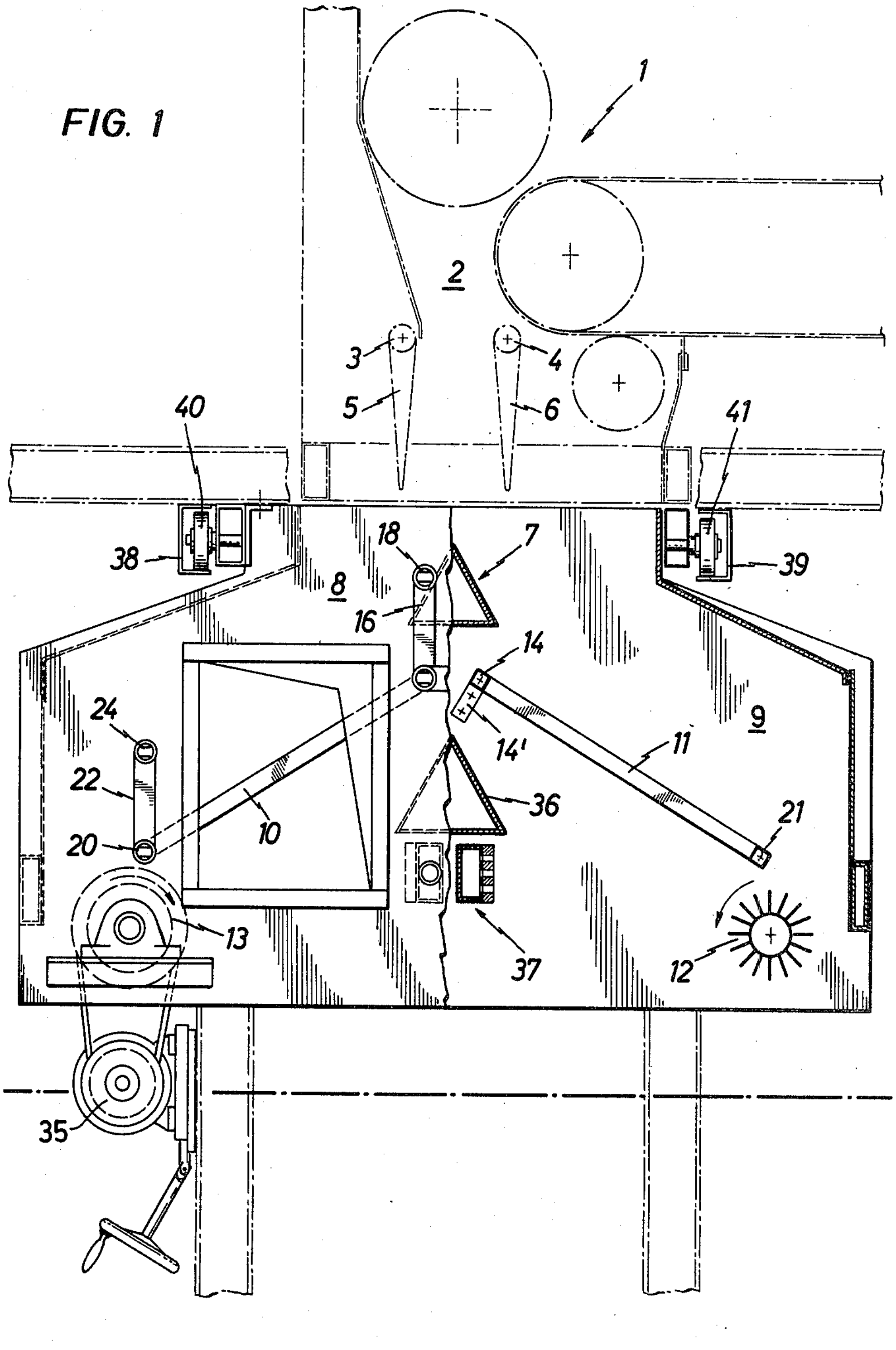
FIG. 1 shows a lateral view of the operator's side of a middle layer forming station according to this invention with a metering tank and two spreading stations; on the righthand side of the drawing, the sidewall and several parts of the forming station have been removed.

Underneath a conventional feeding means or metering tank 1, namely underneath its delivery point 2, two deflection surfaces 5 and 6 pivotable about horizontal axes 3 and 4 are provided which are reciprocated during the operation of the forming station. A roof-shaped baffle 7 is arranged at a certain spacing below these deflection surfaces between the two sidewalls 8 and 9. Two screens 10 and 11 are mounted underneath the roof-shaped baffle 7 so that the entire middle layer material fed via the baffle 7 is discharged downwardly by way of the two screen surfaces. Extremely fine and fine particles fall through the screen, while medium-coarse and coarser particles move across the screen surfaces and are fed to respectively one spreading roll 12 and 13, which rolls deposit the material fed thereto throughout the space underneath the screens 10 and 11 onto a layer carrier. The fine particles of the middle layer material are fed from above to these medium-coarse and coarser particles so that they are then positioned in the middle zone of the board to be manufactured.

Figure 2:
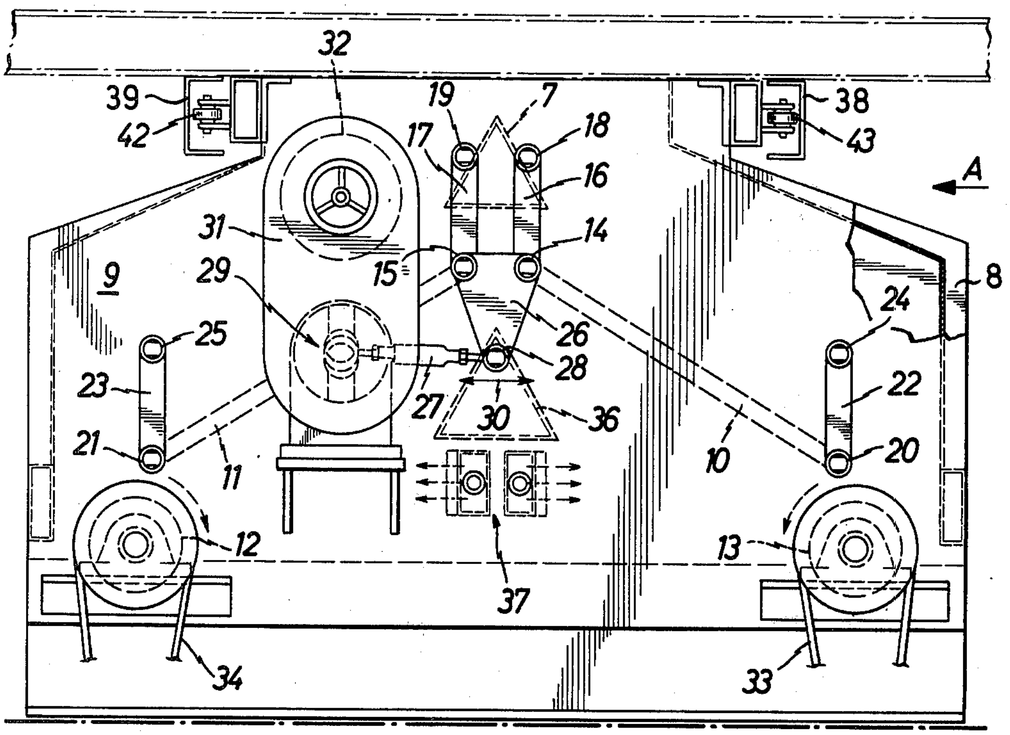
FIG. 2 shows a view of the other side of the forming station.

As can be seen more clearly from FIG. 2, the screens 10 and 11 are articulated in the zone of their upper edges at 14 and 15, respectively, to guide arms as rods 16 and 17, respectively, which in turn are mounted at 18 and 19 to the sidewalls 8 and 9. The lower horizontal edges of the screens 10 and 11 are articulated at 20 and 21, respectively, to guide arms 22 and 23, respectively, which latter are mounted at 24 and 25 to the sidewalls 8 and 9. The points of articulation 14 of screen 10 and the points of articulation 15 of screen 11 are respectively joined together by way of a joining means such as plate 26 having an approximately triangular shape with the apex directed downwardly. In the zone of this apex, an arm 27 is hingedly joined at 28; this arm can be reciprocated in the direction of double arrow 30 by means of an eccentric drive 29, so that the two screens 10 and 11 execute swinging motions essentially in the horizontal direction. The eccentric drive is powered by a motor 32 by way of a gear system 31.

The two spreading rolls 12 and 13 are driven by way of belt drives 33 and 34, respectively, for example by a single motor 35 even though each spreading roll can be drivable independently of the other.

The inclined position of the individual screens is variable; the points of articulation can be changed, as indicated for example in FIG. 1 by the articulation point 14'.

To affect and improve the screening effect, a device 37 ejecting screening air is disposed underneath a roof-shaped cover hood 36 or the like; this device blows air into opposite, horizontal directions as indicated by arrows. The flow velocity of this screening air should be variable, even though this is not absolutely necessary.

The novel spreading unit achieves the formation of an ideal chipboard, as it is desirable, as follows:

The particles are discharged from a metering tank and fall onto a screen with such a mesh width that only the second fraction falls through. The first fraction slides downwardly along the screen and is throw-screened by means of a throwing roll. By the sifting effect of this roll, the particles of the first fraction are separated into the portions [a] and [b], so that the particles in [b] are thrown farther and thus fall between the particles which have fallen down through the screen.

At the same time, an air jet blows transversely through the swarm of particles coming by way of the screen, so that dust and fibers (second fraction [b]0 are separated from the thicker particles (second fraction [a]) and penetrate to the surfaces (bottom or top). Since the air jet also passes through the particles thrown by the spreading roll, the thinner, large-area chips are braked to the greatest extent in their projectile effect and are disposed on the outsides immediately below the dust and the fibers.

To form a chip layer, two such spreading [strewing] devices are, of course, required, namely one operating on the right-hand side and one operating on the left-hand side. These spreading devices can each have its own associated metering tank, or they can be fed by means of a distributor vane by only one metering tank.

Endless sheets can be manufactured with the aid of such a spreading device. The greater the amount of thinner fine proportions (dust, fibers) which are added, the thicker the fine cover layer. For rough building panels, the fine cover layers need only be relatively thin; for finished furniture panels, this layer must be selected to be thicker. It is, of course, possible to provide the boards formed by the novel spreading device in the same spreading operation with additionally at least one other layer applied by a further cover-layer spreading device.

It is also possible to manufacture a chipboard only by means of this novel spreading device and then apply a special cover layer thereto after the pressing step.

Figure 3:
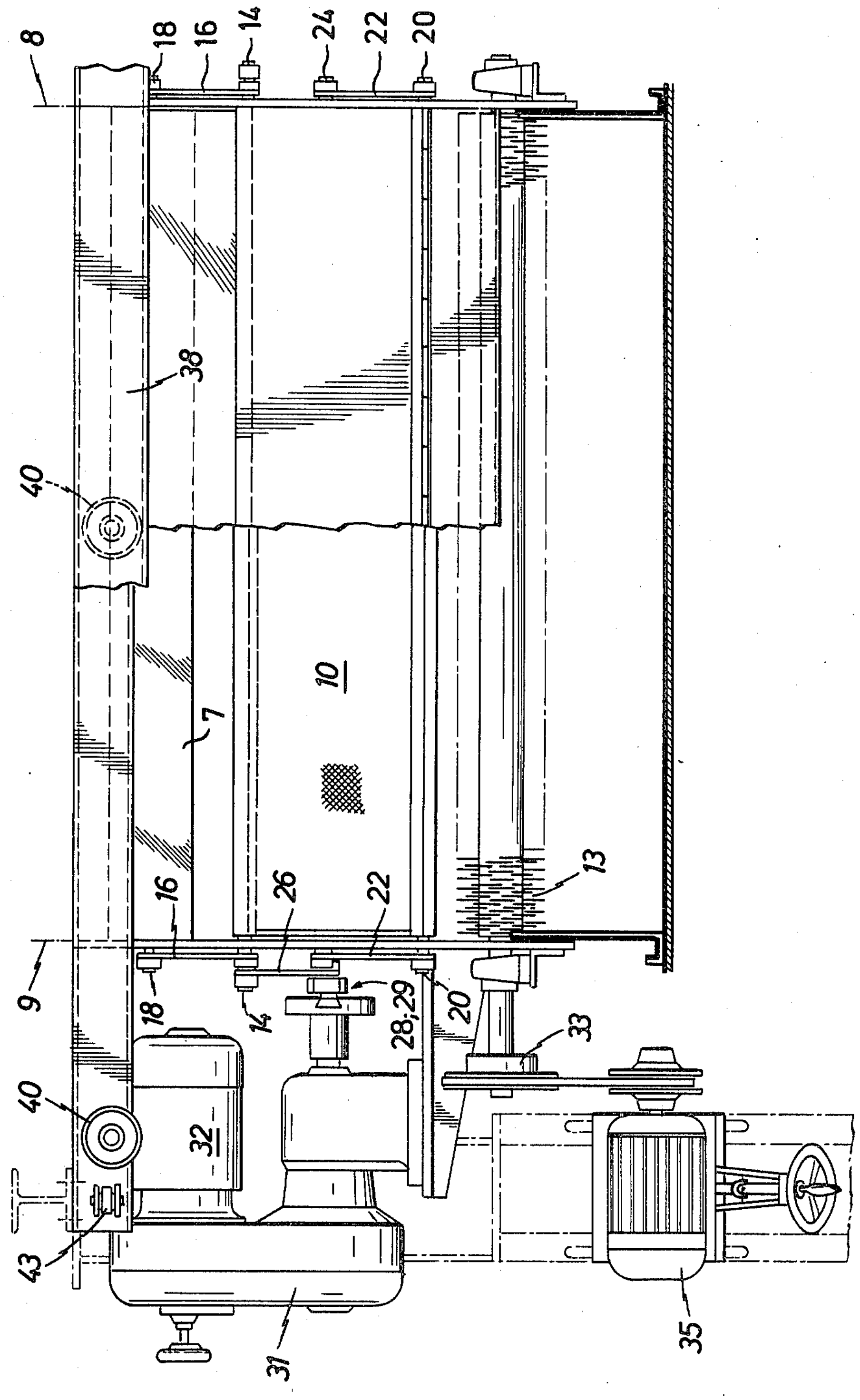
FIG. 3 shows a lateral view of the forming station as seeen in the direction of arrow A in FIG. 2.

It can be seen from FIGS. 1–3 that the entire forming station is displaceable in C-shaped beams 38 and 39 guided by means of runners 40 and 41, respectively; supporting rollers 42 and 43, respectively, provide lateral guidance. The means which securely fix the forming station in its operating position are not illustrated. The forming station can thus be moved transversely out of its position indicated in FIG. 3.

If it is necessary, for some reason, to feed a greater amount of middle layer material for the manufacture of boards than can be supplied via the metering tank 1, then it is possible to arrange also two metering tanks in place of one metering tank. In such a case, it is merely necessary to arrange a screen underneath the delivery point of each metering tank, this screen being moved to and fro in an oscillating fashion. This one screen is then associated also with only one spreading roll.

If it is desirable to manufacture a chipboard or the like including, in addition to the middle layer producible by the method of this invention, also two fine cover layers, then respectively one forming station for applying cover layer material to the layer carrier must be additionally provided upstream and downstream of this middle layer forming station.

It can be seen from the above that, on the basis of the above description of one embodiment, still other embodiments can be readily constructed.

I claim:

1. Apparatus for forming a composite layer of particles for production of particle board comprising:

a movable support for receiving said particles, an inclined screen disposed above said movable support, said inclined screen having an upper edge and a lower edge, feeding means for feeding a mixture of various sized particles, said feeding means being disposed above said inclined screen and including means for depositing said mixture of particles on the upper surface of said screen, said screen having openings therethrough for permitting smaller ones of said particles to fall through said screen onto said movable support while larger ones of said particles pass over said lower edge of the screen without falling through said openings, and spreading means for spreading said larger particles onto said movable support underneath said inclined screen so that said larger particles passing over said lower edge are recombined in a predetermined manner with said smaller particles falling through said screen to form a composite particle layer such that the composite layer includes an increased proportion of larger particles near the extreme edges thereof due to the recombining of said larger particles by said spreading means.

2. Apparatus according to claim 1, wherein said spreading means includes at leaast one spreading roll means.

3. The apparatus of claim 2, further comprising mounting means for mounting said inclined screen for essentially horizontal reciprocation.

4. The apparatus of claim 3, wherein said spreading roll means is parallel to the lower edge of said screen.

5. The apparatus of claim 2, further comprising a means for ejecting screening air in a substantially horizontal direction, said ejecting means being arranged underneath said inclined screen.

6. The apparatus of claim 5, wherein said ejecting means is disposed above the horizontal plane passing through the axis of rotation of said spreading roll means.

7. The apparatus of claim 6, further comprising two of said inclined screens arranged in the manner of a peaked roof and two of said spreading roll means, each one of said spreading roll means being positioned below the lower edge of each of said inclined screens.

8. The apparatus of claim 7, further comprising mounting means for mounting both of said inclined screens for essentially horizontal reciprocation.

9. The apparatus of claim 8, wherein said mounting means includes a plurality of levers pivotally mounted so as to permit the essentially horizontal reciprocation.

10. The apparatus of claim 9, wherein each of the upper edges of said inclined screens are pivotally mounted to at least one of said plurality of levers and each of the lower edges of said screens are pivotally mounted to at least another of said plurality of levers, the levers mounting the upper edges of said inclined screens being connected to one another by a joining means.

11. The apparatus of claim 10, wherein the upper edges of said inclined screens and the levers mounted thereto define respective bearing points, and further wherein said joining means join said respective bearing points together and further include means for reciprocating said joining means through an eccentric drive.

12. The apparatus of claim 8, further comprising a peaked roof-shaped baffle arranged below said feeding means and above the upper ends of said inclined screens.

13. The apparatus of claim 12, further comprising deflecting plates disposed between said feeding means and said peaked roof-shaped baffle, said deflecting plates being pivotal about horizontal axes.

14. The apparatus of claim 6, further comprising frame means for mounting said inclined screen and said spreading roll means, and further comprising means for moving said frame means at approximately right angles with respect to the travel direction of said movable support.

15. The apparatus of claim 1, further comprising two of said inclined screens arranged in the manner of a peaked roof and two of said spreading roll means, each one of said spreading roll means being positioned below the lower edge of each of said inclined screens.

16. The apparatus of claim 15, further comprising mounting means for mounting both of said inclined screens for essentially horizontal reciprocation.

17. The apparatus of claim 16, wherein said mounting means includes a plurality of levers pivotally mounted so as to permit the essentially horizontal reciprocation.

18. The apparatus of claim 17, wherein each of the upper edges of said inclined screens are pivotally mounted to at least one of said plurality of levers and each of the lower edges of said screens are pivotally mounted to at least one of said plurality of levers, the levers mounting the upper edges of said inclined screens being connected to one another by a joining means.

19. The apparatus of claim 18, wherein the upper edges of said inclined screens and the levers mounted thereto define respective bearing points, and further wherein said joining means join said respective bearing points together and further include means for reciprocating said joining means through an eccentric drive.

20. The apparatus of claim 16, further comprising a peaked roof-shaped baffle arranged below said feeding means and above the upper ends of said inclined screens.

21. The apparatus of claim 20, further comprising deflecting plates disposed between said feeding means and said peaked roof-shaped baffle, said deflecting plates being pivotal about horizontal axes.

22. The apparatus of claim 5, further comprising frame means for mounting said inclined screen and said spreading roll means, and further comprising means for moving said frame means at approximately right angles with respect to the travel direction of said movable support.

23. Apparatus for forming a composite layer of particles for production of particle board comprising:

a movable support for receiving said particles, an inclined screen disposed above said movable support, said inclined screen having an upper edge and a lower edge, feeding means for feeding a mixture of various sized particles, said feeding means being disposed above said inclined screen and including means for depositing said mixture of particles on the upper surface of said screen, said screen having openings therethrough for permitting smaller ones of said particles to fall through said screen onto said movable support while larger ones of said particles pass over said lower edge of the screen without falling through said openings, spreading means for spreading the thicker of said larger particles farther from said spreading means and simultaneously for spreading the thinner of said larger particles closer to said spreading means onto said movable support, after said larger particles have passed over the lower edge of said inclined screen, and means for ejecting screening air for separating the thinner of said smaller particles from the thicker of said smaller particles, after said smaller particles have fallen through said inclined screen, and before said smaller particles have fallen onto said movable support, whereby all of said particles fall onto said movable support to form a composite particle layer having an increased proportion of larger particles near the middle zone of said composite particle layer and an increased proportion of smaller particles near the topside and underside of said composite particle layer.

* * * * *